(12) United States Patent
Su et al.

(10) Patent No.: US 10,014,963 B2
(45) Date of Patent: Jul. 3, 2018

(54) METHOD AND APPARATUS FOR FACILITATING ANTENNA CALIBRATION AND TRANSCEIVER

(71) Applicant: Telefonaktiebolaget LM Ericsson (publ), Stockholm (SE)

(72) Inventors: Youping Su, Täby (SE); Ming Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 7 days.

(21) Appl. No.: 15/500,860

(22) PCT Filed: Sep. 11, 2014

(86) PCT No.: PCT/CN2014/086294
§ 371 (c)(1),
(2) Date: Jan. 31, 2017

(87) PCT Pub. No.: WO2016/037338
PCT Pub. Date: Mar. 17, 2016

(65) Prior Publication Data
US 2017/0222739 A1     Aug. 3, 2017

(51) Int. Cl.
*H01Q 3/04*     (2006.01)
*H04B 17/12*     (2015.01)
(Continued)

(52) U.S. Cl.
CPC .......... *H04B 17/12* (2015.01); *H01Q 1/521* (2013.01); *H01Q 3/267* (2013.01)

(58) Field of Classification Search
CPC .......... H01Q 1/521; H01Q 3/04; H01Q 3/267
See application file for complete search history.

(56) References Cited

U.S. PATENT DOCUMENTS 5,936,569 A    8/1999   Ståhle et al.
8,102,785 B2 *   1/2012   Rao .................. H01Q 3/267
                                                                      370/278
(Continued)

FOREIGN PATENT DOCUMENTS

CN          101826903 A     9/2010

OTHER PUBLICATIONS

International Search Report and Written Opinion for International Patent Application No. PCT/CN2014/086294, dated Apr. 29, 2016, 12 pages.
(Continued)

*Primary Examiner* — Hoang Nguyen
(74) *Attorney, Agent, or Firm* — Sage Patent Group

(57) ABSTRACT

An apparatus for facilitating antenna calibration comprising: a directional coupler having first, second, third and fourth ports, the first port selectively connected to a radio transmitter or a radio receiver and the second port connected to an antenna; a power combiner/divider having first, second and third ports; the first port of the power combiner/divider selectively connected to a measurement receiver or a measurement transmitter and the second port of the power combiner/divider connected to the third port of the direction coupler; and a magnitude and phase adjustor connected between the fourth port of the directional coupler and the third port of the power combiner/divider. The magnitude and phase adjustor is configured to be tuned such that any signal input to the second port of the directional coupler results in an output smaller than a predetermined threshold at the first port of the power combiner/divider.

15 Claims, 13 Drawing Sheets

(51) Int. Cl.
*H01Q 1/52* (2006.01)
*H01Q 3/26* (2006.01)

(56) References Cited

U.S. PATENT DOCUMENTS

| | | |
|---|---|---|
| 2006/0044185 A1 | 3/2006 | Jin et al. |
| 2008/0198773 A1 | 8/2008 | Loh |
| 2008/0285637 A1* | 11/2008 | Liu ........................ H01Q 3/267 |
| | | 375/224 |
| 2013/0260844 A1 | 10/2013 | Rucki et al. |

OTHER PUBLICATIONS

Supplementary European search report for the application No. 14901740.2 dated Mar. 9, 2018, pp. 7.
Jian Lie et al., "OFDM-MIMO WLAN AP front-end gain and phase mismatch calibration" Radio and wirless conference, IEEE, Atlanta, Sep. 19, 2004, pp. 151-154, XP010764572, Sec 3.
Joe Ho Jung et al. "Calibration techniques of multi-channel transceiver using noninterfering calidration signals for cdma smart antenna system" Aug. 26-30, 2002, IEEE vol. 2, Aug. 26, 2002, pp. 1629-1632, XP010627352, Sec 2, Fig1,2.

* cited by examiner

METHOD AND APPARATUS FOR FACILITATING ANTENNA CALIBRATION AND TRANSCEIVER

TECHNICAL FIELD

The present disclosure generally relates to radio frequency (RF) technology, and more particularly, to a method and an apparatus for facilitating antenna calibration and a transceiver.

BACKGROUND

Antenna Calibration (AC) plays an important role in an RF transceiver. For example, beamforming performance of an RF transceiver is dependent on the AC accuracy.

For beamforming, it is generally required that radio branches in an RF transceiver are convergent, i.e., having the same phase and magnitude responses. Hence, each radio branch should be calibrated against the other branches in terms of phase and magnitude responses. However, the phase response is likely to differ between radio branches as they may have different feeder lengths and different internal analog filters.

The AC technique has been widely adopted in multi-antenna radio systems to enhance their beamforming performances. A typical AC includes measuring and calculating relative transfer functions between radio branches, calculating compensation coefficients and applying the compensation coefficients to compensate for differences in phase and magnitude responses between the radio braches.

Conventionally, in order to obtain the phase and magnitude responses of a radio branch connected with an antenna, an external coupler is provided very close to the antenna or built-in to the antenna. This is so-called external AC. Alternatively, an internal AC technique has been proposed. For most of site solutions, the antenna is very close to the radio unit, the difference in feeder lengths between radio branches could be negligible. So, an internal coupler unit can be deployed inside the radio unit. The internal AC is an important aspect to fulfill the AC function without any auxiliary hardware outside the radio unit. The basic idea of the internal AC is to provide a measurement transmitter and a measurement receiver and to compare the differences in phase and magnitude responses between the radio braches using internal Voltage Standing Wave Ratio (VSWR) Forward (FWD) couplers.

FIGS. 1A and 1B are schematic diagrams showing an RF transceiver 100 with internal AC. As shown in FIGS. 1A and 1B, the RF transceiver includes a radio unit 110 and a number of antennas 101, 102, 103 and 104. The radio unit 110 includes a number of radio branches each associated with one of the antennas, of which only one radio branch 111 is shown. The radio branch 111 includes a radio transmitter 121 and a radio receiver 122 for transmitting and receiving radio signals via the antenna 101. The radio unit 110 further includes a measurement transmitter 112 and a measurement receiver 113 for transmitting and receiving calibration signals, respectively. The radio unit 110 further includes a coupler unit 114 having a number of couplers (e.g., VSWR RWD couplers) each connected to one of the antennas. One of the couplers is shown at 123, which is also a part of the radio branch 111 and selectively connected to the radio transmitter 121 and the radio transmitter 122. The coupler unit 114 further includes a switch 124 for selectively connecting one of the measurement transmitter 112 and the measurement receiver 113 with one of the couplers.

FIG. 1A shows a signal flow for calibration associated with the radio receiver 122. As indicated by the arrows, a calibration signal is transmitted from the measurement transmitter 112 to the coupler 123 via the switch 124 and is received by the radio receiver 122 via coupling by the coupler 123. FIG. 1B shows a signal flow for calibration associated with the radio transmitter 121. As indicated by the arrows, a calibration signal is transmitted from the radio transmitter 121 to the coupler 123, coupled via the coupler 123 and is received by the measurement receiver 113 via the switch 124. The internal AC shown in FIGS. 1A and 1B can calibrate differences in phase and magnitude responses between the radio branches before the calibration plane as indicated by the vertical dashed line.

FIGS. 2A and 2B are schematic diagrams showing two types of AC sequences, serial AC sequence and parallel AC sequence, respectively. As shown in FIG. 2A, for the serial AC sequence, the radio branches are calibrated sequentially in different time slots. That is, when one radio branch is being calibrated, the other branches may have traffic or may be idle. As shown in FIG. 2B, for the parallel AC sequence, the radio branches are calibrated simultaneously in the same time slots.

However, interferences from Antenna Reference Point (ARP), i.e., external interferences entering an RF unit via an antenna, could adversely affect the AC accuracy, which in turn will degrade the beamforming performance.

FIGS. 3A and 3B show interferences in the AC scenarios of FIGS. 1A and 1B, respectively. In FIG. 3A, as indicated by the dashed line, the interference from ARP enters the radio receiver via the coupler. In FIG. 3B, as indicated by the dashed line, the interference from ARP enters the measurement receiver via the coupler and the switch. The AC accuracy is largely dependent on the Signal to Interference and Noise Ratio (SINR) at the radio receiver (FIG. 3A) or the measurement receiver (FIG. 3B). There are two parameters contributing to the SINR, the thermal noise, or Signal to Noise Ratio (SNR), and the interference, or Signal to Interference Ratio (SIR), i.e., SINR=SNR+SIR. Typically, due to limitations on characteristics of analog components, the thermal noise can only be restricted to a certain range. Then, the SIR is the only parameter which is critical to the optimization of the SINR.

For the calibration associated with the radio receiver as shown in FIG. 3A, the SIR can be improved by increasing the power level of the calibration signal transmitted by the measurement transmitter. However, the measurement transmitter (which operates at the same frequency as the radio receiver) generates spurious emission at the ARP, which should be limited to a specified power spectral density (e.g., lower than −85 dBm/MHz for Time Division Duplex (TDD) or −110 dBm/100 KHz for Frequency Division Duplex (FDD)). Such limitation results in a limited power level of the calibration signal.

For the calibration associated with the radio transmitter as shown in FIG. 3B, the measurement receiver suffers from strong in-channel or adjacent-channel interference, especially when there are other transceivers co-located. The SIR will be even worse if the transceiver is used in a low power station, e.g., a micro/pico base station or user equipment (UE). FIG. 4 shows a possible interference scenario where the transceiver is used in a base station. If the serial AC sequence is adopted, traffics in other radio branches could result in interferences through mutual antenna leakage (i.e., self-interference). That is, the AC has to suffer from cumulative interferences from all of other radio branches. In addition, there will be inter-station interferences from other base stations, which could be at maximum 25 dBm (considering a 50 dBm interference and a 25 dB antenna isolation).

There is thus a need for an AC solution with improved SIR and thus improved accuracy.

SUMMARY

It is an object of the present disclosure to provide a method and an apparatus for facilitating antenna calibration and a transceiver, capable of improving SIR and thus the AC accuracy.

In a first aspect, an apparatus for facilitating antenna calibration is provided. The apparatus comprises: a directional coupler having a first port, a second port, a third port and a fourth port, the first port selectively connected to a radio transmitter or a radio receiver and the second port connected to an antenna; a power combiner/divider having a first port, a second port and a third port; the first port of the power combiner/divider selectively connected to a measurement receiver or a measurement transmitter and the second port of the power combiner/divider connected to the third port of the direction coupler; and a magnitude and phase adjustor connected between the fourth port of the directional coupler and the third port of the power combiner/divider. The magnitude and phase adjustor is configured to be tuned such that any signal input to the second port of the directional coupler results in an output smaller than a predetermined threshold at the first port of the power combiner/divider.

In an embodiment, for antenna calibration associated with the radio transmitter, the directional coupler is configured to connect its first port to the radio transmitter such that a calibration signal from the radio transmitter is inputted to the first port of the directional coupler and results in a coupled calibration signal at the third port of the directional coupler via coupling. The directional coupler is configured to receive an interference signal from the antenna via its second port, such that the interference signal results in an isolated interference signal at the third port of the directional coupler via isolation and a coupled interference signal at the fourth port of the directional coupler via coupling. The magnitude and phase adjustor is configured to modify a magnitude and a phase of the coupled interference signal to generate a modified interference signal. The power combiner/divider is configured to connect its first port to the measurement receiver and combine the coupled calibration signal, the isolated interference signal and the modified interference signal into an input to the measurement receiver. The modified interference signal and the isolated interference signal cancel each other.

In an embodiment, the modified interference signal has the same magnitude as the isolated interference signal but a 180° phase shift relative thereto.

In an embodiment, for antenna calibration associated with the radio receiver, the power combiner/divider is configured to connect its first port to the measurement transmitter such that a calibration signal from the measurement transmitter is inputted to the first port of the power combiner/divider. The power combiner/divider is configured to divide the calibration signal into a first component signal and a second component signal outputted from the second and third ports of the power combiner/divider, respectively. The first component signal results in an isolated signal at the second port of the directional coupler via isolation. The magnitude and phase adjustor is configured to modify a magnitude and a phase of the second component signal to generate a modified signal which results in a coupled signal at the second port of the directional coupler via coupling. The coupled signal and the isolated signal cancel each other.

In an embodiment, the coupled signal has the same magnitude as the isolated signal but a 180° phase shift relative thereto.

In an embodiment, the apparatus further comprises a delayer connected between the third port of the directional coupler and the second port of the power combiner/divider.

In an embodiment, the magnitude and phase adjustor is a vector modulator.

In a second aspect, a transceiver is provided. The transceiver comprises: one or more branches each comprising a radio transmitter, a radio receiver and an antenna; and a measurement transmitter and a measurement receiver. Each branch further comprises an apparatus for facilitating antenna calibration according to the above first aspect.

In an embodiment, the transceiver is a base station or a user equipment.

In a third aspect, a method for facilitating antenna calibration is provided. The method comprises: receiving, at a first port of a directional coupler, a calibration signal from a radio transmitter, such that the calibration signal results in a coupled calibration signal at a third port of the directional coupler via coupling; receiving, at a second port the directional coupler, an interference signal from an antenna, such that the interference signal results in an isolated interference signal at the third port of the directional coupler via isolation and a coupled interference signal at a fourth port of the directional coupler via coupling; modifying a magnitude and a phase of the coupled interference signal to generate a modified interference signal; and combining the coupled calibration signal, the isolated interference signal and the modified interference signal into an input to a measurement receiver. the modified interference signal and the isolated interference signal cancel each other.

In an embodiment, the modified interference signal has the same magnitude as the isolated interference signal but a 180° phase shift relative thereto.

In an embodiment, the method further comprises, prior to the step of combining: delaying the isolated interference signal.

In a fourth aspect, a method for facilitating antenna calibration is provided. The method comprises: receiving a calibration signal from a measurement transmitter; and dividing the calibration signal into a first component signal and a second component signal to be inputted to a third port and fourth port of a directional coupler, respectively. The first component signal results in an isolated signal at a second port of the directional coupler via isolation. The method further comprises: modifying a magnitude and a phase of the second component signal to generate a modified signal which results in a coupled signal at the second port of the directional coupler via coupling. The coupled signal and the isolated signal cancel each other.

In an embodiment, the coupled signal has the same magnitude as the isolated signal but a 180° phase shift relative thereto.

In an embodiment, the method further comprises: delaying the first component signal before it is inputted to the third port of the directional coupler.

With the embodiments of the present disclosure, a magnitude and phase adjustor is provided and tuned such that the interference from the ARP can be substantially canceled before inputted to the measurement receiver, or such that the calibration signal from the measurement receiver has substantially no contribution to the spurious emission at the ARP. In this way, it is possible to improve the SIR and thus the AC accuracy.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 1A:
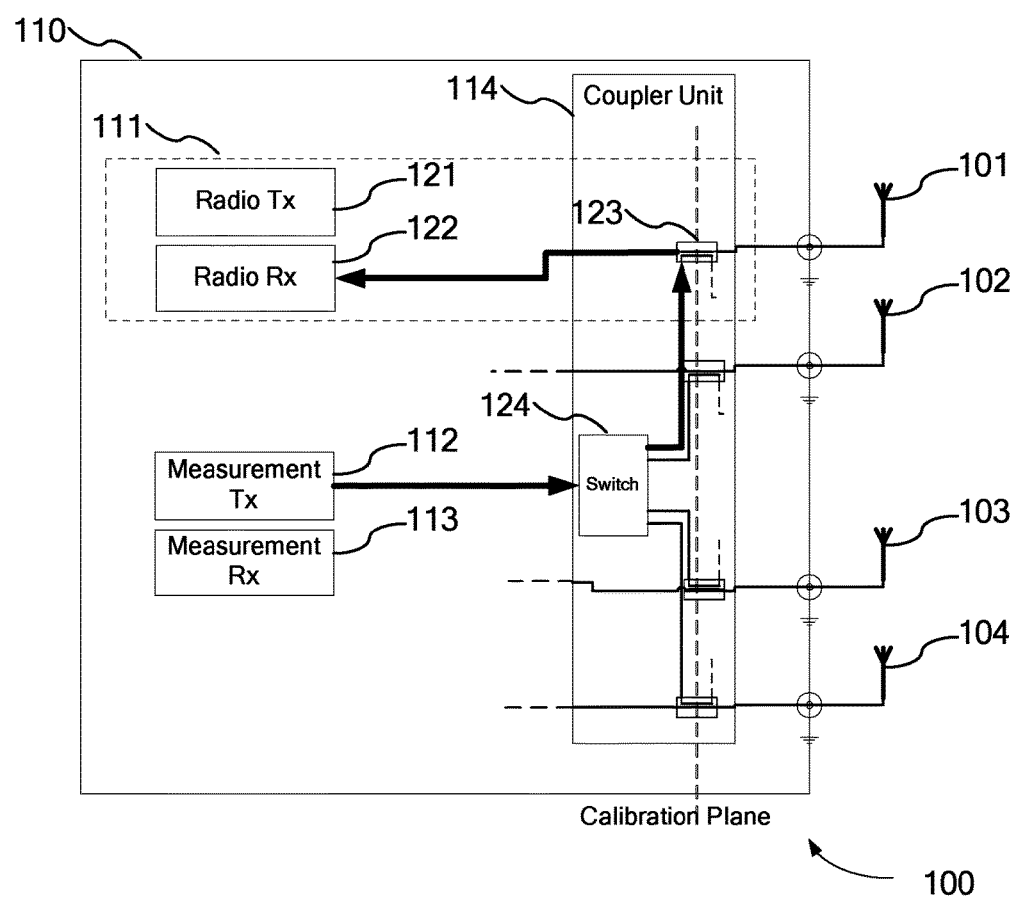
FIGS. 1A and 1B are schematic diagrams showing an RF transceiver with internal AC.
Figure 1B:
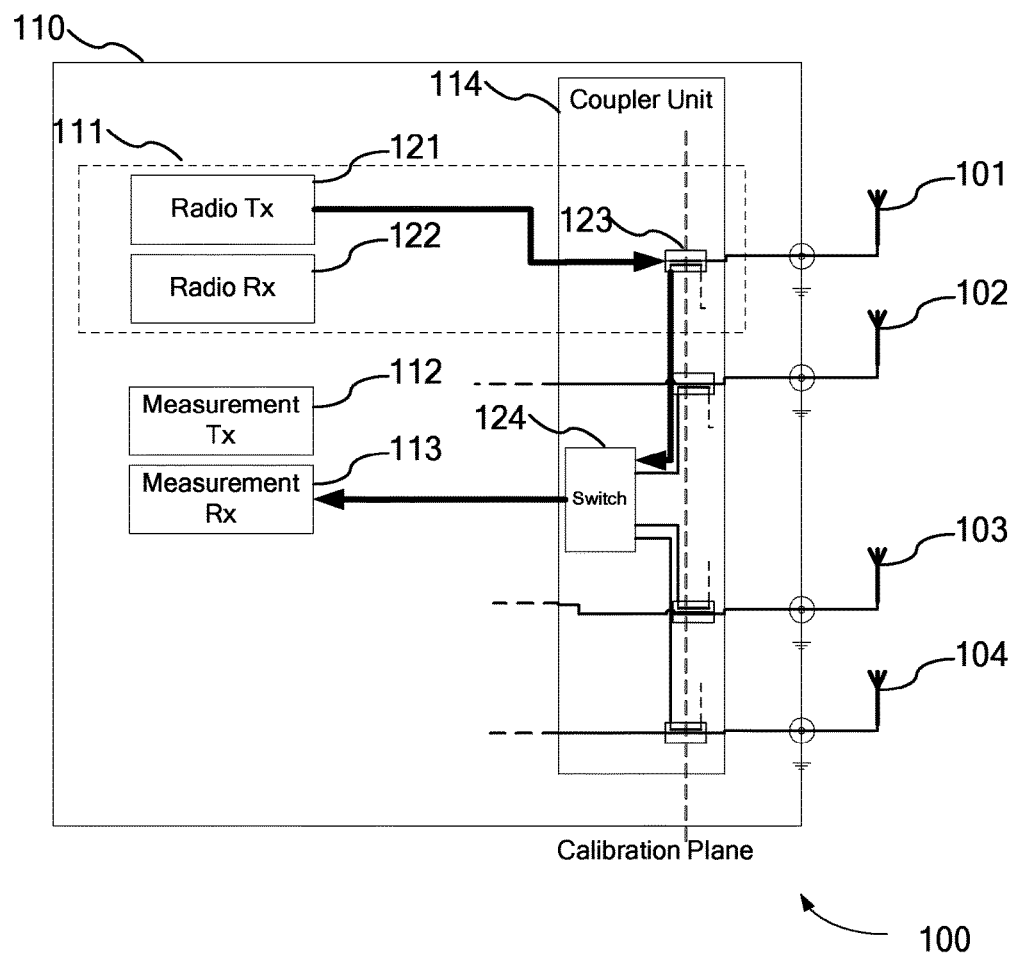
Figure 2A:
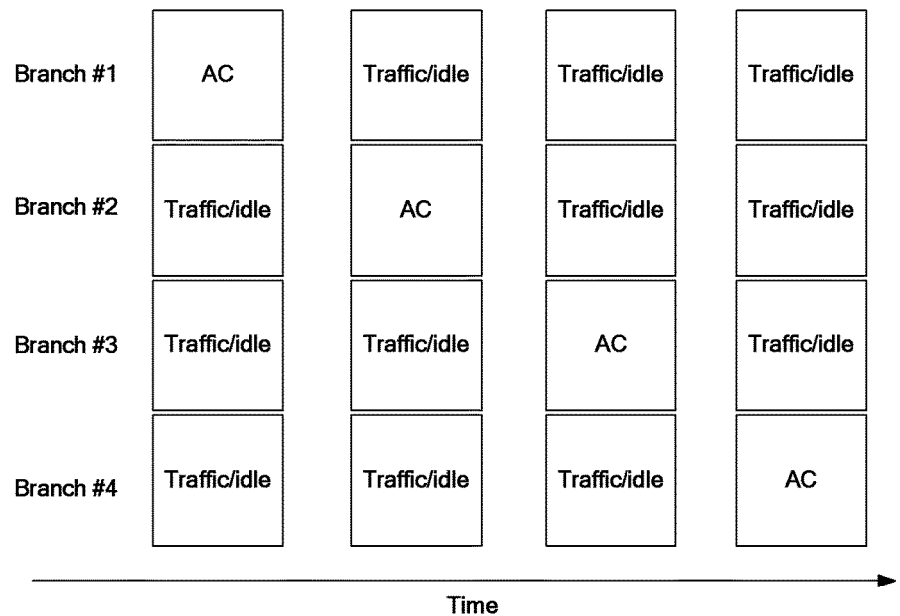
FIGS. 2A and 2B are schematic diagrams showing serial and parallel AC sequences, respectively.
Figure 2B:
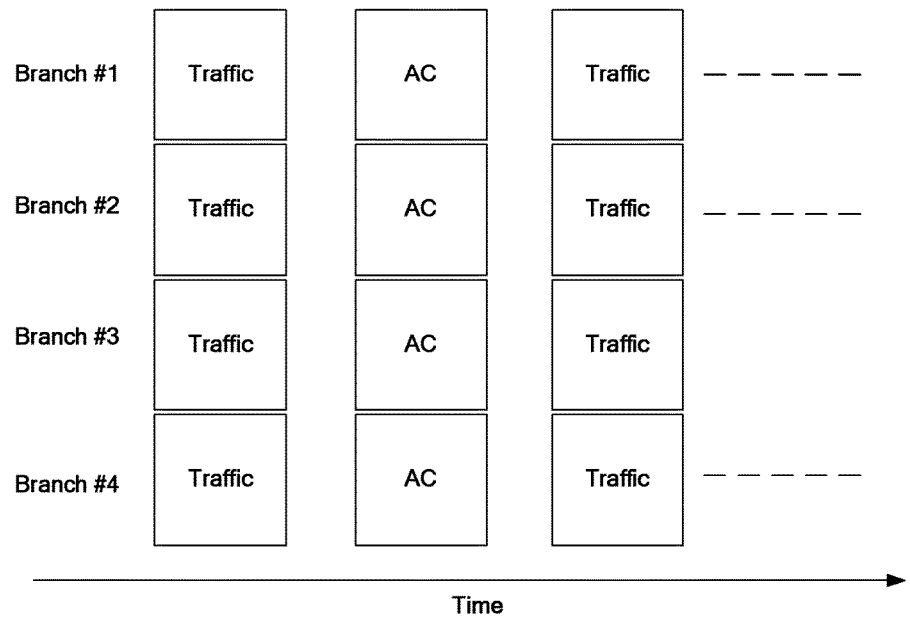
Figure 3A:
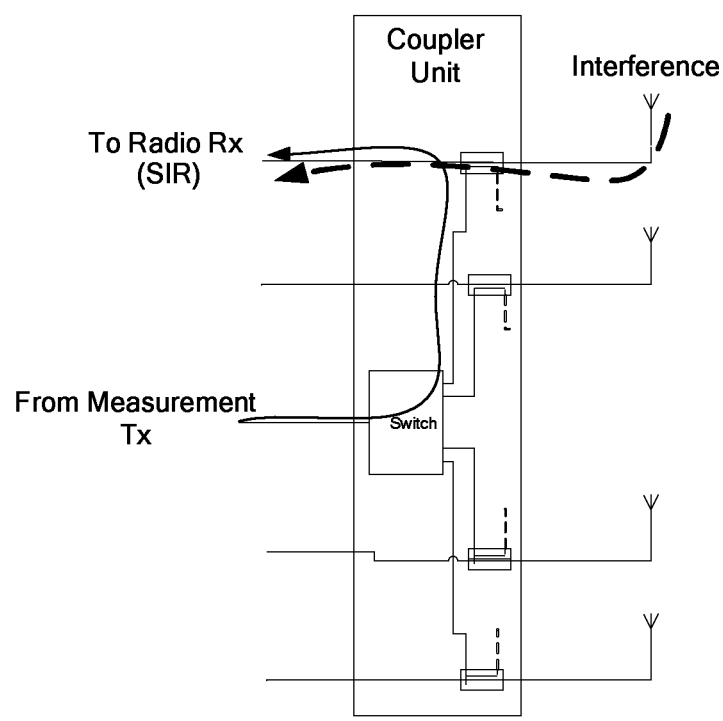
FIGS. 3A and 3B are schematic diagrams showing interferences in the AC scenarios of FIGS. 1A and 1B.
Figure 3B:
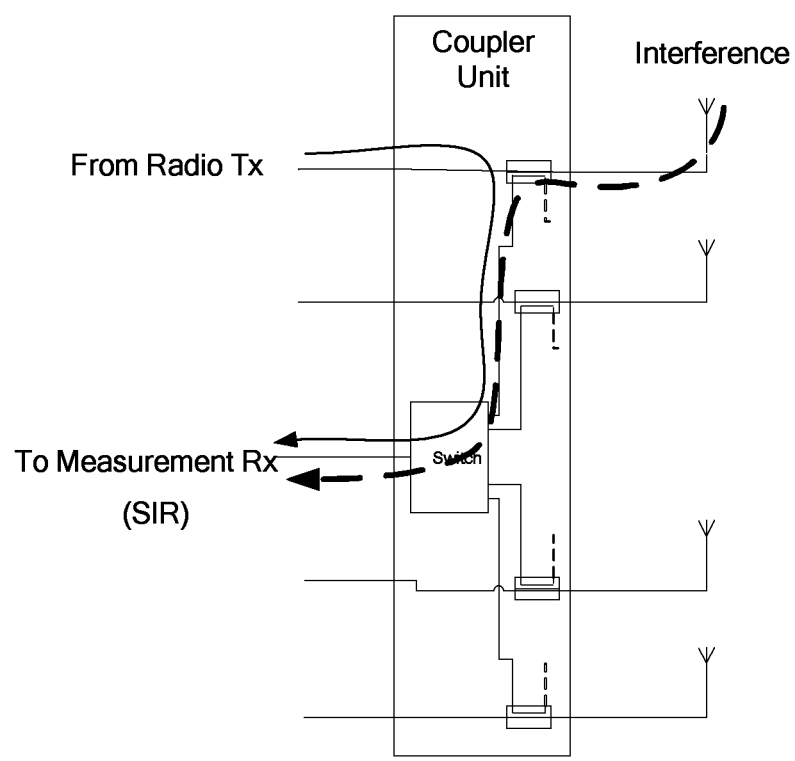
Figure 4:
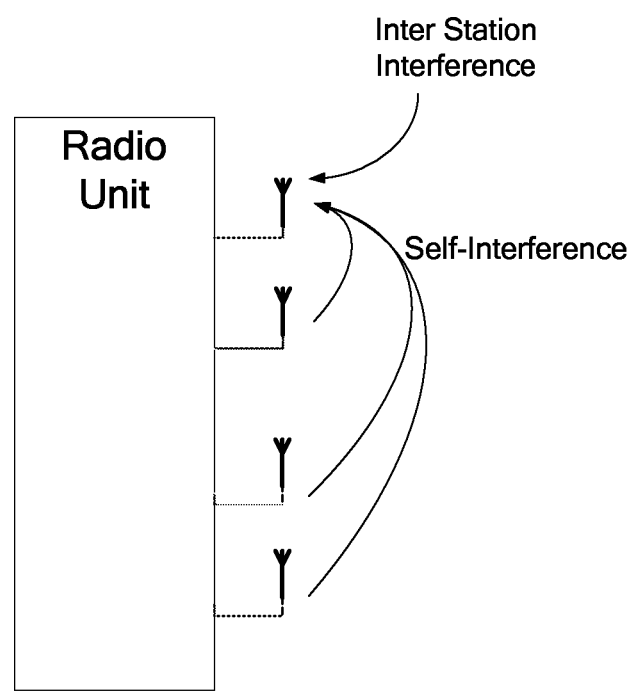
FIG. 4 is a schematic diagram showing an interference scenario where the transceiver is used in a base station.
Figure 5:
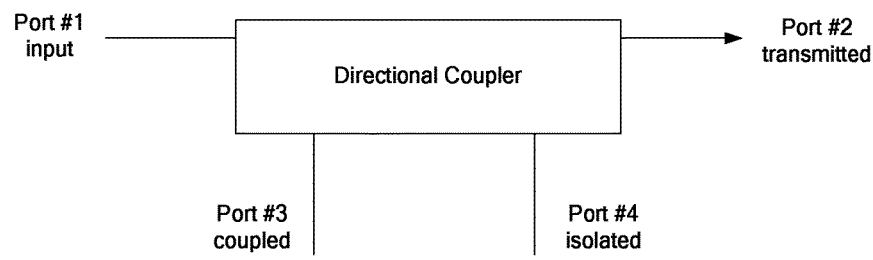
FIG. 5 is a schematic diagram showing a structure of a direction coupler.

Before introducing the embodiments of the present disclosure, a structure of a directional coupler will be explained briefly with reference to FIG. 5. For example, the coupler 123 of FIG. 1 can be a directional coupler. As shown in FIG. 5, the directional coupler includes four ports. When Port #1 is an input port, Port #2 is a transmitted port, Port #3 is a coupled port and Port #4 is an isolated port. As can be appreciated by those skilled in the art, due to the reciprocity of the ports, any of Port #2, Port #3 and Port #4 can serve as the input port. As an example, when Port #2 is the input port for example, Port #1 is the transmitted port, Port #3 is the isolated port and Port #4 is the coupled port. Compared with the input port, the transmitted port has no phase shift (0°), the coupled port has a phase shift of 90° and the isolated port has a phase shift of 180°.

Figure 6:
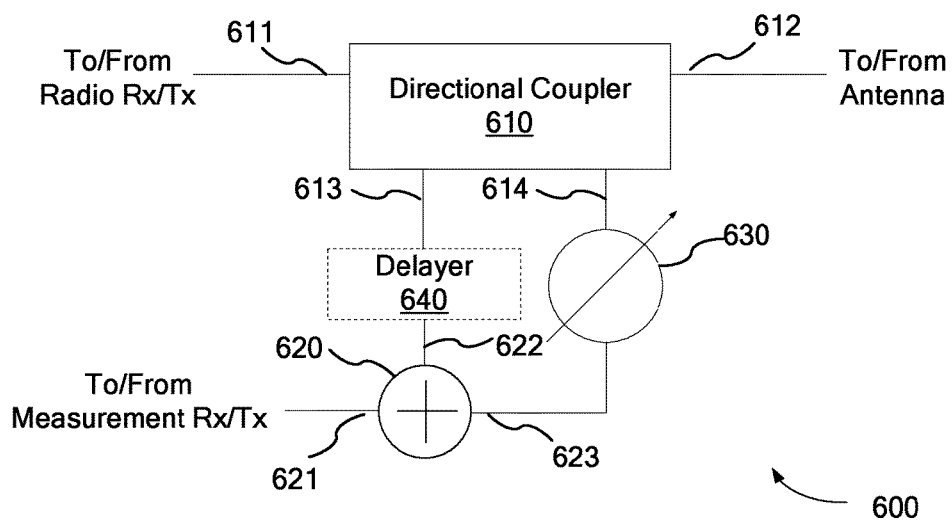
FIG. 6 is a schematic diagram showing an apparatus for facilitating AC according to an embodiment of the present disclosure.

FIG. 6 is a schematic diagram showing an apparatus 600 for facilitating AC according to an embodiment of the present disclosure. As shown in FIG. 6, the apparatus 600 includes a directional coupler 610 having a first port 611, a second port 612, a third port 613 and a fourth port 614. The first port 611 selectively connected to a radio transmitter or a radio receiver, e.g., via a switch (not shown). The second port 612 is connected to an antenna.

The apparatus 600 further includes a power combiner/divider 620 having a first port 621, a second port 622 and a third port 623. The first port 621 of the power combiner/divider 620 is selectively connected to a measurement receiver or a measurement transmitter, e.g., via a switch (not shown). The second port 622 of the power combiner/divider 620 is connected to the third port 613 of the direction coupler 610. Here, when the power combiner/divider 620 serves as a power divider, the first port 621 is its input port and the second port 622 and the third port 623 are its output ports; whereas when the power combiner/divider 620 serves as a power combiner, the second port 622 and the third port 623 are its input ports and the first port 621 is its output port.

The apparatus 600 further includes a magnitude and phase adjustor 630 connected between the fourth port 614 of the directional coupler 610 and the third port 623 of the power combiner/divider 620. The magnitude and phase adjustor 620 is configured to be tuned such that any signal input to the second port 612 of the directional coupler 610 results in an output smaller than a predetermined threshold at the first port 621 of the power combiner/divider 620. Here, the predetermined threshold can be set to a small value sufficiently close to zero. That is, any signal input to the second port 612 of the directional coupler 610 results in a substantially zero output at the first port 621 of the power combiner/divider 620. Equivalently, the magnitude and phase adjustor 620 is tuned such that any signal input to the first port 621 of the power combiner/divider 620 results in an output smaller than the predetermined threshold at the second port 612 of the directional coupler 610.

Figure 7:
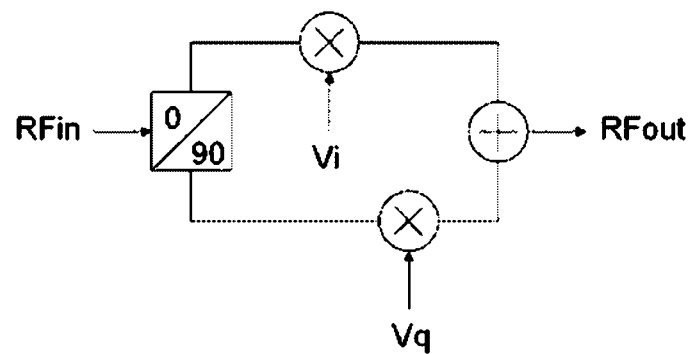
FIG. 7 is a schematic diagram showing a structure of a vector modulator.

As an example, the magnitude and phase adjustor 620 is a vector modulator (VM). FIG. 7 shows a structure of a VM. The VM can continuously adjust a magnitude of an input signal, RFin within a certain range. The VM can also continuously adjust a phase of the input signal RFin in a range from 0° to 360°. As shown in FIG. 7, the VM first splits the input signal RFin, with a 90° network, into an in-phase (I) component and a quadrature (Q) component. The magnitudes and phases of the I and Q components are then adjusted independently by multiplying them with Direct Circuit (DC) vectors Vi and Vq, respectively. Finally, the adjusted I and Q components are combined into an output signal, RFout. The principle of the VM is known to those skilled in the art and details thereof will be omitted here.

Figure 8:
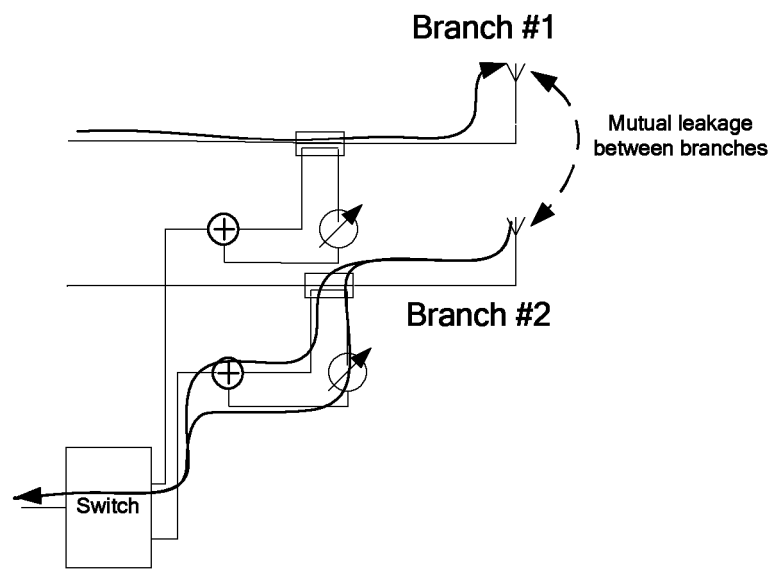
FIG. 8 is a schematic diagram showing how to tune the vector modulator of FIG. 7.

FIG. 8 shows an example explaining how the magnitude and phase adjustor 620 can be tuned. In this example, the magnitude and phase adjustor 620 is the VM shown in FIG. 7 and is applied in an RF transceiver including more than one branch each including a radio transmitter, a radio receiver, an antenna and the apparatus 600. In order to tune the VM in Branch #2, the radio transmitter in Branch #1 can transmit a signal which will enter Branch #2 via mutual leakage between these branches. The output of the power combiner is connected, via a switch, to the measurement receiver. The VM in Branch #2 is tuned until the signal received at the measurement receiver is substantially zero. It can be appreciated by those skilled in the art that it is exemplary only to use the mutual leakage between the branches as the signal source for tuning the VM and any other signal source can be used as appropriate.

Optionally, the apparatus 600 may further include a delayer 640 (FIG. 6) connected between the third port 613 of the directional coupler 610 and the second port 622 of the power combiner/divider 620. The use of the delayer 640 introduces phase shift and thus can make the tuning of the magnitude and phase adjustor 620 easier.

Figure 9:
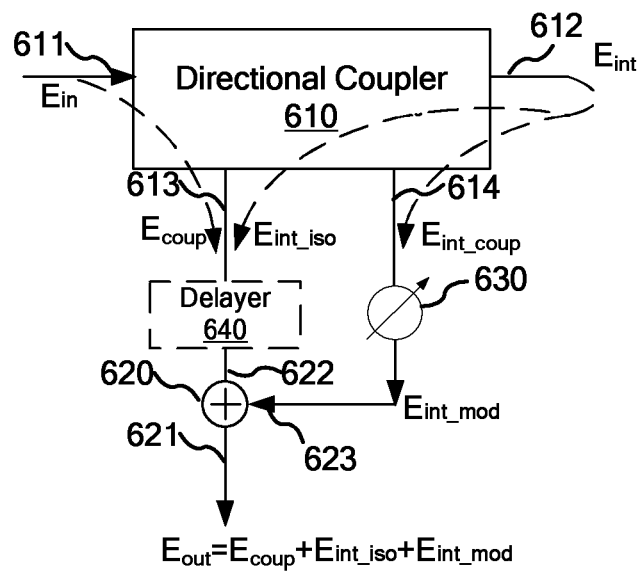
FIG. 9 is a schematic diagram showing how the apparatus of FIG. 6 works to facilitate AC associated with a radio transmitter.
Figure 9:
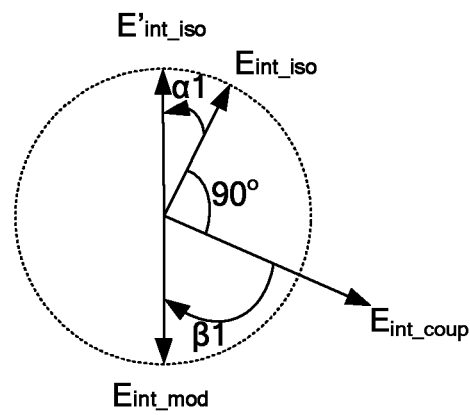

FIG. 9 is a schematic diagram showing how the apparatus 600 of FIG. 6 works to facilitate AC associated with a radio transmitter.

As shown in the upper part of FIG. 9, for AC associated with the radio transmitter, the directional coupler 610 is configured to connect its first port 611 to the radio transmitter such that a calibration signal, $E_{in}$, from the radio transmitter is inputted to the first port 611 of the directional coupler 610 and results in a coupled calibration signal, $E_{coup}$, at the third port 613 of the directional coupler 610 via coupling. The directional coupler 610 is configured to receive an interference signal, $E_{int}$, from the antenna via its second port 612, such that the interference signal $E_{int}$ results in an isolated interference signal, $E_{int\_iso}$, at the third port 613 of the directional coupler 610 via isolation and a coupled interference signal, $E_{int\_coup}$, at the fourth port 614 of the directional coupler 610 via coupling.

The magnitude and phase adjustor 630 is configured to modify a magnitude and a phase of the coupled interference signal $E_{int\_coup}$ to generate a modified interference signal, $E_{int\_mod}$.

The power combiner/divider 620 is configured to connect its first port 621 to the measurement receiver and combine the coupled calibration signal $E_{coup}$, the isolated interference signal $E_{int\_iso}$ and the modified interference signal $E_{int\_mod}$ into an input, $E_{out}$, to the measurement receiver. The modified interference signal $E_{int\_mod}$ and the isolated interference signal $E_{int\_iso}$ cancel each other. That is, $$E_{out}=E_{coup}+E_{int\_iso}+E_{int\_mod}=E_{coup}.$$

Optionally, the delayer 640 can be provided and configured to delay, i.e., introduce a phase shift to, the coupled interference signal $E_{int\_coup}$ and the isolated interference signal $E_{int\_iso}$, resulting in phase shifted signals $E'_{int\_coup}$ and $E'_{int\_iso}$, respectively. In this case, the modified interference signal $E_{int\_mod}$ and the phase shifted signal $E'_{int\_iso}$ cancel each other. That is, $E_{out}=E'_{coup}+E'_{int\_iso}+E_{int\_mod}=E'_{coup}$.

The lower part of FIG. 9 shows the magnitude and phase adjustment by the magnitude and phase adjustor 630. Here it is assumed that the delayer 640 is provided and introduces a phase shift of α1 to the isolated interference signal $E_{int\_iso}$, resulting in a phase shifted signals $E'_{int\_iso}$. There is inherently a phase shift of 90° between $E_{int\_iso}$ and $E_{int\_coup}$. The magnitude and phase adjustor 630 modifies the magnitude of $E_{int\_coup}$ to be the same as the magnitude of $E'_{int\_iso}$ and rotates the phase of $E_{int\_coup}$ by β1=90°−α1. In other words, the modified interference signal $E_{int\_mod}$ has the same magnitude as $E'_{int\_iso}$ but a 180° phase shift relative thereto.

Therefore, the interference from the ARP, i.e., $E_{int}$, does not contribute to the interference at the measurement receiver. Accordingly, the SIR at the measurement receiver can be improved.

Figure 10:
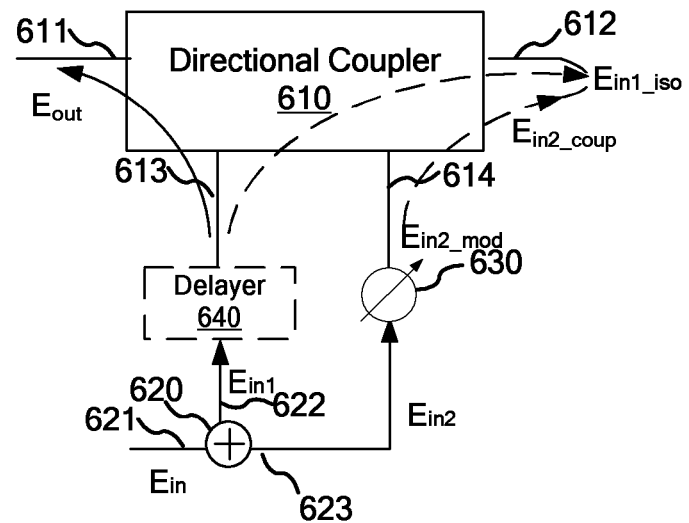
FIG. 10 is a schematic diagram showing how the apparatus of FIG. 6 works to facilitate AC associated with a radio receiver.
Figure 10:
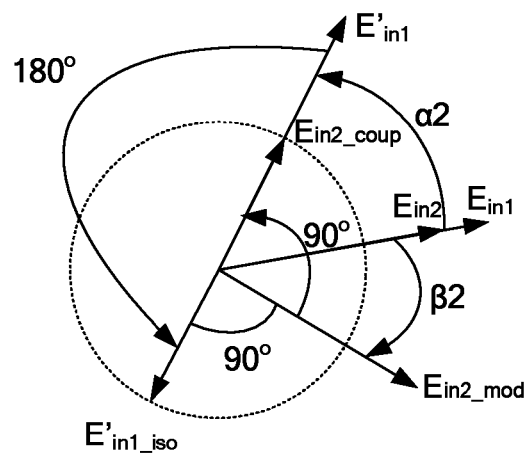

FIG. 10 is a schematic diagram showing how the apparatus 600 of FIG. 6 works to facilitate AC associated with a radio receiver.

As shown in the upper part of FIG. 10, for AC associated with the radio receiver, the power combiner/divider 620 is configured to connect its first port 621 to the measurement transmitter such that a calibration signal, $E_{in}$, from the measurement transmitter is inputted to the first port 621 of the power combiner/divider 620. The power combiner/divider 620 is configured to divide the calibration signal $E_{in}$ into a first component signal $E_{in1}$ and a second component signal $E_{in2}$ outputted from the second 622 and third 623 ports of the power combiner/divider 620, respectively. The first component signal $E_{in1}$ and the second component signal $E_{in2}$ have the same phase and their magnitudes can be the same or different. The first component signal $E_{in1}$ results in an isolated signal, $E_{in1\_iso}$, at the second port 612 of the directional coupler 610 via isolation. The first component signal $E_{in1}$ also results in a signal, $E_{out}$, at the first port 611 of the directional coupler 610, which is to be inputted to the radio receiver.

The magnitude and phase adjustor 630 is configured to modify a magnitude and a phase of the second component signal $E_{in2}$ to generate a modified signal, $E_{in2\_mod}$, which results in a coupled signal, $E_{in2\_coup}$, at the second port 612 of the directional coupler 610 via coupling. The coupled signal $E_{in2\_coup}$ and the isolated signal $E_{in1\_iso}$ cancel each other. That is, the calibration signal $E_{in}$ does not contribute to the spurious emission at the ARP since $E_{in2\_coup}+E_{in1\_iso}=0$.

Optionally, the delayer 640 can be provided and configured to delay, i.e., introduce a phase shift to, the first component signal $E_{in1}$, resulting in a phase shifted signal $E'_{in1}$. In this case, the phase shifted signal $E'_{in1}$ results in an isolated signal, $E'_{in1\_iso}$, at the second port 612 of the directional coupler 610 via isolation. The coupled signal $E_{in2\_coup}$ and the isolated signal $E'_{in1\_iso}$ cancel each other. That is, $E_{in2\_coup}+E'_{in1\_iso}=0$.

The lower part of FIG. 10 shows the magnitude and phase adjustment by the magnitude and phase adjustor 630. Here it is assumed that the delayer 640 is provided and introduces a phase shift of α2 to the first component signal $E_{in1}$, resulting in a phase shifted signal $E'_{in1}$. There is inherently a phase shift of 180° between $E'_{in1}$ and $E'_{in1\_iso}$. The magnitude and phase adjustor 630 modifies the magnitude of $E_{in2}$ and rotates the phase of $E_{in2}$ by β2=90°−α2, resulting a modified signal $E_{in2\_mod}$. There is inherently a phase shift of 90° between $E_{in2\_mod}$ and $E_{in2\_coup}$. Finally, the coupled signal $E_{in2\_coup}$ and the isolated signal $E'_{in1\_iso}$ cancel each other. In other words, the coupled signal $E_{in2\_coup}$ has the same magnitude as the isolated signal $E'_{in1\_iso}$ but a 180° phase shift relative thereto.

Therefore, the calibration signal $E_{in}$ does not contribute to the spurious emission at the ARP. Accordingly, the SIR at the radio receiver can be improved by increasing the power level of the calibration signal $E_{in}$ while satisfying the requirement on the spurious emission.

It can be appreciated by those skilled in the art that, even if the delayer 640 is omitted, the feeder line between the third port 613 of the directional coupler 610 and the second port 622 of the power combiner/divider 620 will cause some delay, or phase shift. Similarly, each feeder line shown in FIGS. 9 and 10 will introduce some phase shift to the signal transmitted over it. However, such phase shift does not affect the operation of the apparatus 600. The apparatus 600 works as long as the magnitude and phase adjustor 620 is tuned such that any signal input to the second port 612 of the directional coupler 610 results in a substantially zero output at the first port 621 of the power combiner/divider 620 (or equivalently, any signal input to the first port 621 of the power combiner/divider 620 results in a substantially zero output at the second port 612 of the directional coupler 610).

Figure 11:
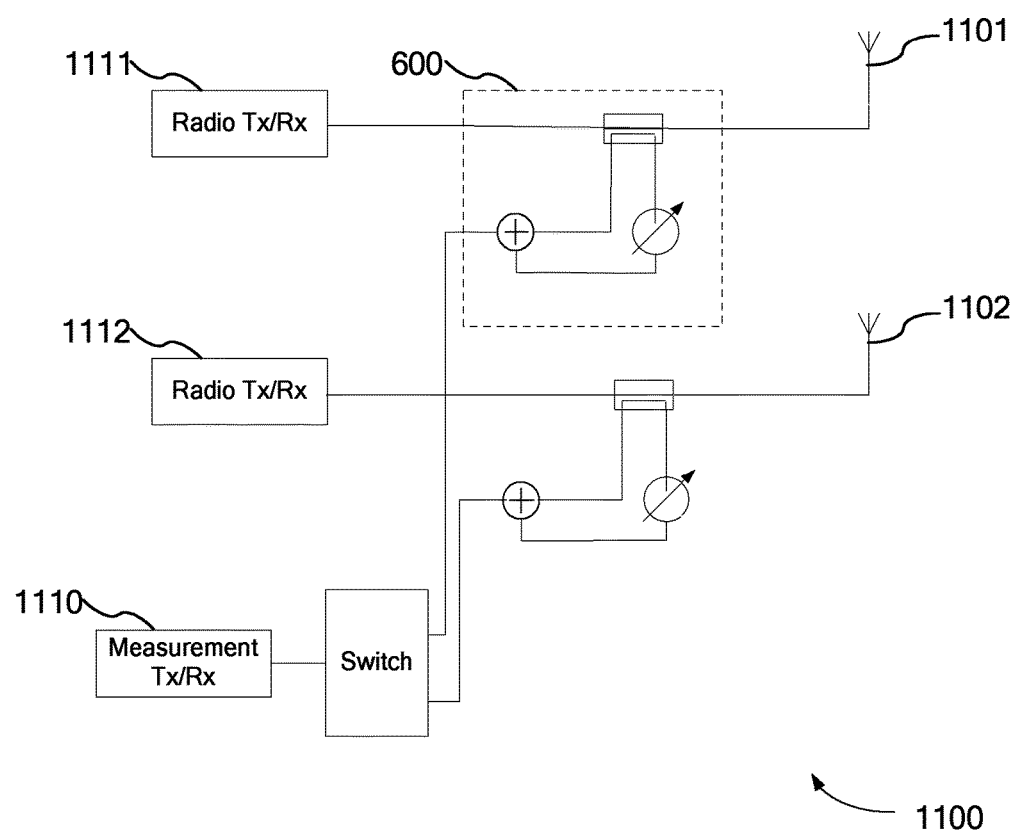
FIG. 11 is a schematic diagram showing a transceiver according to an embodiment of the present disclosure.

FIG. 11 shows a transceiver 1100 according to an embodiment of the present disclosure. The transceiver 1100 can be a base station or user equipment.

The transceiver 1100 includes: one or more branches each including a radio transmitter 1111, 1112, a radio receiver 1111, 1112 and an antenna 1101, 1102. The transceiver 1100 further includes a measurement transmitter and a measurement receiver 1110. Each branch further comprises an apparatus 600 of FIG. 6.

While FIG. 11 shows a transceiver 1100 including two branches, it can be appreciated by those skilled in the art that the transceiver may include more or less branches and the present disclosure is not limited to any specific number of branches included in the transceiver.

Figure 12:
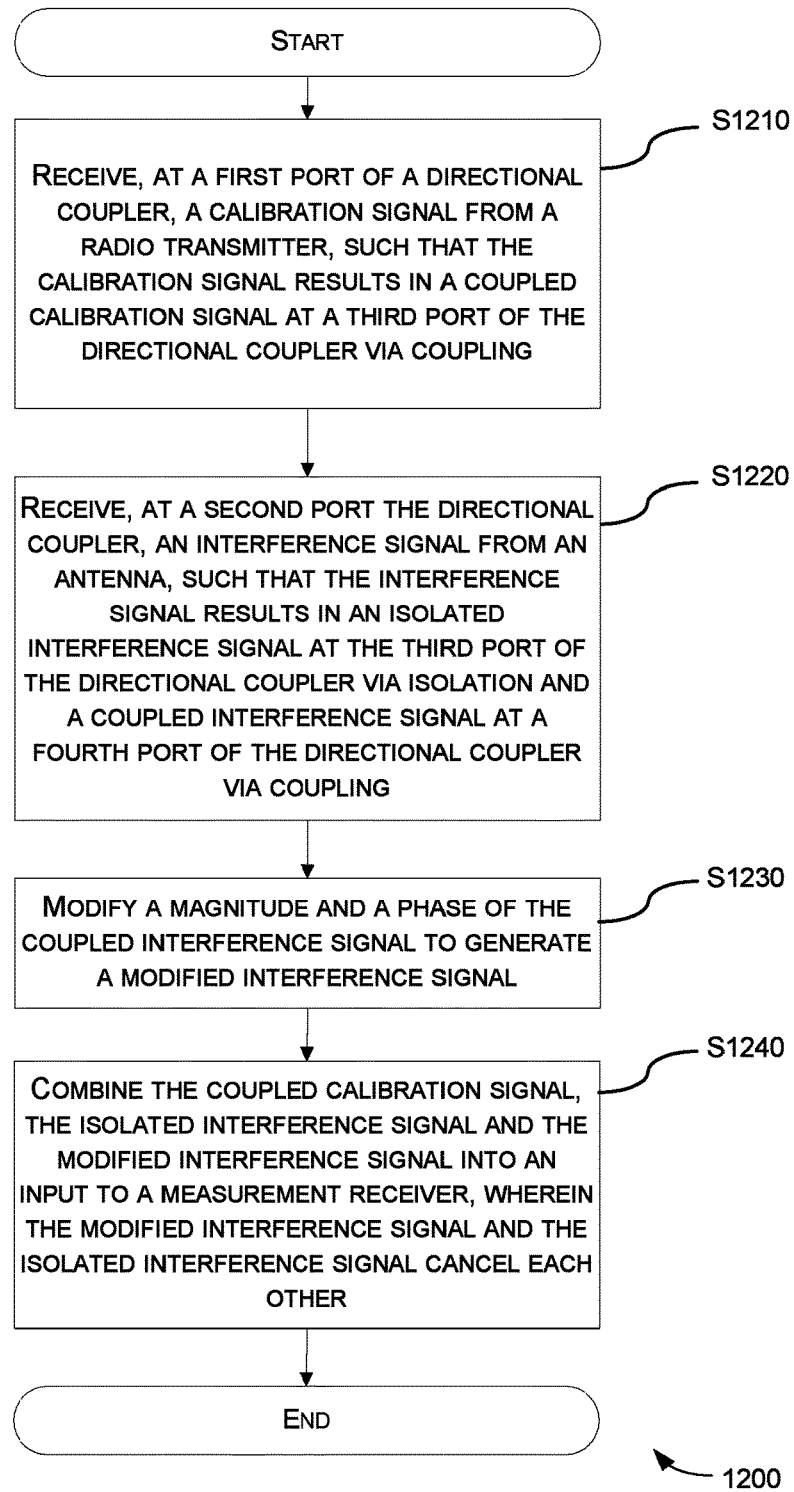
FIG. 12 is a flowchart showing a method for facilitating AC according to an embodiment of the present disclosure.

FIG. 12 is a flowchart showing a method 1200 for facilitating AC associated with a radio transmitter according to an embodiment of the present disclosure. The method 1200 can be implemented using the apparatus 600 of FIG. 6 and includes the following steps.

At step S1210, a calibration signal from a radio transmitter is received at a first port of a directional coupler, such that the calibration signal results in a coupled calibration signal at a third port of the directional coupler via coupling.

At step S1220, an interference signal from an antenna is received at a second port the directional coupler, such that the interference signal results in an isolated interference signal at the third port of the directional coupler via isolation and a coupled interference signal at a fourth port of the directional coupler via coupling.

At step S1230, a magnitude and a phase of the coupled interference signal are modified to generate a modified interference signal.

At step S1240, the coupled calibration signal, the isolated interference signal and the modified interference signal are combined into an input to a measurement receiver. The modified interference signal and the isolated interference signal cancel each other.

In an embodiment, the modified interference signal has the same magnitude as the isolated interference signal but a 180° phase shift relative thereto.

In an embodiment, the method 1200 further includes, prior to the step S1240, a step of delaying the isolated interference signal.

Figure 13:
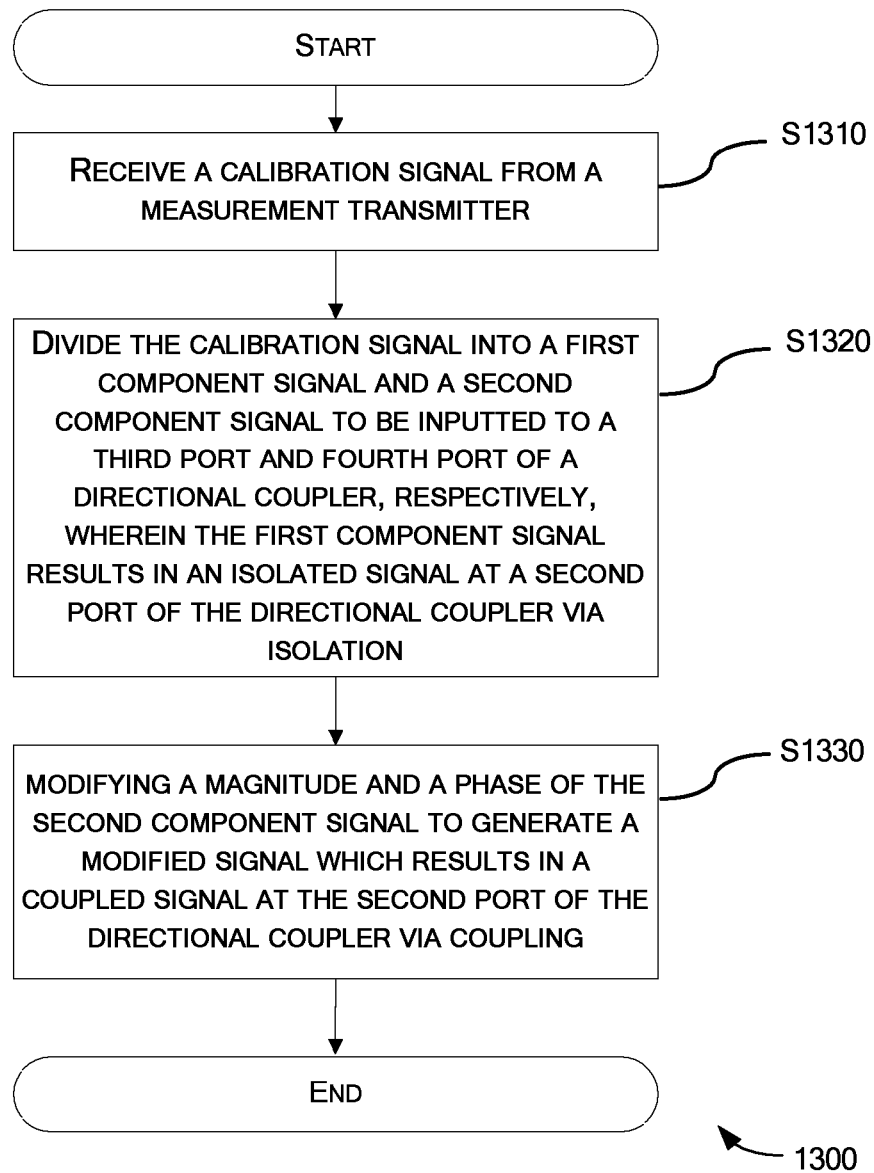
FIG. 13 is a flowchart showing a method for facilitating AC according to another embodiment of the present disclosure.

FIG. 13 is a flowchart showing a method 1300 for facilitating AC associated with a radio receiver according to an embodiment of the present disclosure. The method 1300 can be implemented using the apparatus 600 of FIG. 6 and includes the following steps.

At step S1310, a calibration signal from a measurement transmitter is received.

At step S1320, the calibration signal is divided into a first component signal and a second component signal to be inputted to a third port and fourth port of a directional coupler, respectively. The first component signal results in an isolated signal at a second port of the directional coupler via isolation.

At step S1330, a magnitude and a phase of the second component signal are modified to generate a modified signal which results in a coupled signal at the second port of the directional coupler via coupling.

The coupled signal and the isolated signal cancel each other.

In an embodiment, the coupled signal has the same magnitude as the isolated signal but a 180° phase shift relative thereto.

In an embodiment, the method 1300 further includes a step of delaying the first component signal before it is inputted to the third port of the directional coupler.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. An apparatus for facilitating antenna calibration, comprising:
   a directional coupler having a first port, a second port, a third port and a fourth port, the first port selectively connected to a radio transmitter or a radio receiver and the second port connected to an antenna;
   a power combiner/divider having a first port, a second port and a third port; the first port of the power combiner/divider selectively connected to a measurement receiver or a measurement transmitter and the second port of the power combiner/divider connected to the third port of the direction coupler; and
   a magnitude and phase adjustor connected between the fourth port of the directional coupler and the third port of the power combiner/divider,
   wherein the magnitude and phase adjustor is configured to be tuned such that:
      any signal input to the second port of the directional coupler results in an output smaller than a predetermined threshold at the first port of the power combiner/divider.

2. The apparatus of claim 1, wherein, for antenna calibration associated with the radio transmitter:
   the directional coupler is configured to connect its first port to the radio transmitter such that a calibration signal from the radio transmitter is inputted to the first port of the directional coupler and results in a coupled calibration signal at the third port of the directional coupler via coupling;
   the directional coupler is configured to receive an interference signal from the antenna via its second port, such that the interference signal results in an isolated interference signal at the third port of the directional coupler via isolation and a coupled interference signal at the fourth port of the directional coupler via coupling;
   the magnitude and phase adjustor is configured to modify a magnitude and a phase of the coupled interference signal to generate a modified interference signal; and
   the power combiner/divider is configured to connect its first port to the measurement receiver and combine the coupled calibration signal, the isolated interference signal and the modified interference signal into an input to the measurement receiver, wherein the modified interference signal and the isolated interference signal cancel each other.

3. The apparatus of claim 2, wherein the modified interference signal has the same magnitude as the isolated interference signal but a 180° phase shift relative thereto.

4. The apparatus of claim 1, wherein, for antenna calibration associated with the radio receiver:
   the power combiner/divider is configured to connect its first port to the measurement transmitter such that a calibration signal from the measurement transmitter is inputted to the first port of the power combiner/divider;
   the power combiner/divider is configured to divide the calibration signal into a first component signal and a second component signal outputted from the second and third ports of the power combiner/divider, respectively, wherein the first component signal results in an isolated signal at the second port of the directional coupler via isolation; and
   the magnitude and phase adjustor is configured to modify a magnitude and a phase of the second component signal to generate a modified signal which results in a coupled signal at the second port of the directional coupler via coupling, wherein the coupled signal and the isolated signal cancel each other.

5. The apparatus of claim 4, wherein the coupled signal has the same magnitude as the isolated signal but a 180° phase shift relative thereto.

6. The apparatus of claim 1, further comprising a delayer connected between the third port of the directional coupler and the second port of the power combiner/divider.

7. The apparatus of claim 1, wherein the magnitude and phase adjustor is a vector modulator.

8. A transceiver comprising:
one or more branches each comprising a radio transmitter, a radio receiver and an antenna; and
a measurement transmitter and a measurement receiver;
wherein each branch further comprises an apparatus for facilitating antenna calibration according to claim 1.

9. The transceiver of claim 8, wherein the transceiver is a base station or a user equipment.

10. A method for facilitating antenna calibration, comprising:
receiving, at a first port of a directional coupler, a calibration signal from a radio transmitter, such that the calibration signal results in a coupled calibration signal at a third port of the directional coupler via coupling;
receiving, at a second port the directional coupler, an interference signal from an antenna, such that the interference signal results in an isolated interference signal at the third port of the directional coupler via isolation and a coupled interference signal at a fourth port of the directional coupler via coupling;
modifying a magnitude and a phase of the coupled interference signal to generate a modified interference signal; and
combining the coupled calibration signal, the isolated interference signal and the modified interference signal into an input to a measurement receiver, wherein the modified interference signal and the isolated interference signal cancel each other.

11. The method of claim 10, wherein the modified interference signal has the same magnitude as the isolated interference signal but a 180° phase shift relative thereto.

12. The method of claim 10, further comprising, prior to said combining:
delaying the isolated interference signal.

13. A method for facilitating antenna calibration, comprising:
receiving a calibration signal from a measurement transmitter;
dividing the calibration signal into a first component signal and a second component signal to be inputted to a third port and fourth port of a directional coupler, respectively, wherein the first component signal results in an isolated signal at a second port of the directional coupler via isolation; and
modifying a magnitude and a phase of the second component signal to generate a modified signal which results in a coupled signal at the second port of the directional coupler via coupling,
wherein the coupled signal and the isolated signal cancel each other.

14. The method of claim 13, wherein the coupled signal has the same magnitude as the isolated signal but a 180° phase shift relative thereto.

15. The method of claim 13, further comprising:
delaying the first component signal before it is inputted to the third port of the directional coupler.

* * * * *